J. URMSTON.
Method of and Apparatus for Drying Hubs.
No. 8,633. Reissued Mar. 25, 1879.
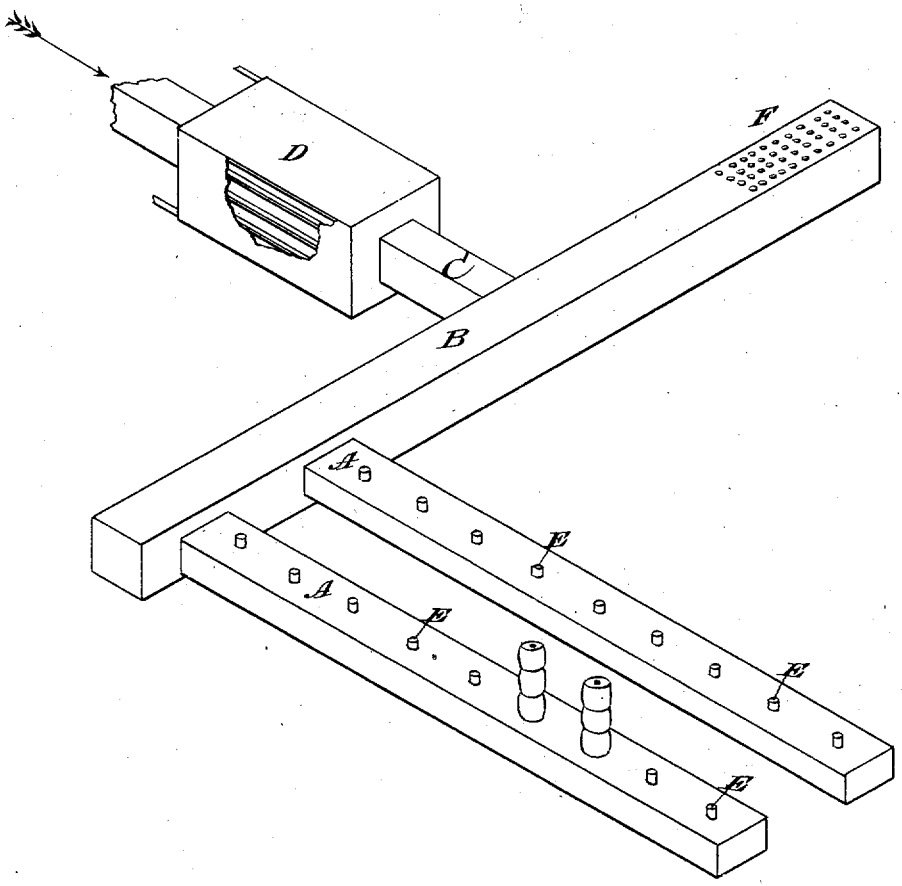
WITNESSES:
Charles C. Stetson
E. B. Bolton
INVENTOR:
John Urmston
by his attorney
J. B. Stetson
N. PETERS, PHOTO-LITHOGRAPHER, WASHINGTON, D. C.

UNITED STATES PATENT OFFICE.

JOHN URMSTON, OF RAHWAY, NEW JERSEY.

IMPROVEMENT IN METHODS OF AND APPARATUS FOR DRYING HUBS.

Specification forming part of Letters Patent No. 172,592, dated January 25, 1876; Reissue No. 8,633, dated March 25, 1879; application filed January 31, 1879.

*To all whom it may concern:*

Be it known that I, JOHN URMSTON, of the city of Rahway, county of Union, and State of New Jersey, have invented a certain new and useful Improvement in Methods of and Apparatus for Drying or Seasoning Hubs, Hub-Blocks, &c., which improvement is fully set forth in the following description, reference being had herein to the drawing accompanying this specification, which is a perspective view, showing in one figure two forms of my apparatus.

The object of my improvement is seasoning or drying the hubs and similar articles expeditiously in dry air, avoiding the moisture from steam, and also the injury to the wood from the too great heat of steam-pipes passed through the bore of the hub. If I use steam, it is only to warm the air. I move an active current of only slightly warmed dry air through the holes in the axes of the hub and hub-blocks.

This object I attain by means of a series of square or other shaped tubes, preferring the square form, having as many tubes as the business may require. These tubes have their ends inserted in the air-box B, as shown at A.

The upper sides of the tubes have perforations E, over which the orifice in a hub or block is placed, resting upon the pipe. If desirable, short thimbles can be put in the holes centrally over the holes.

Other hubs and blocks are piled upon those on the pipes, and the air is forced through by an ordinary blower. A receiver, D, is provided and placed between the blower (not shown) and the air-box B, with a coil of pipe therein for steam to pass through when deemed needful to warm the air.

I also provide a series of perforations, which may be placed close together on the broad flat top or platform on the air-box B, as at F, upon which fellies can be piled and the air forced between them, and spokes can be placed endwise and a box inclose them.

It will be observed that the flat surface, with holes at F, is much wider than the diameter of the hubs on E. I can dry hubs as well as other lumber on the plain perforated platform F; but it is important, in order to realize the benefits of my invention, that the hubs be placed so that the current from one of the holes shall flow through the hole in the center, and that means be provided for moving such current of dry air actively through the hole.

My method of drying avoids all danger of a great increase of temperature in the center of the hubs. It dries and shrinks it with the moderation necessary to preserve the fullest strength.

Air-tight apartments are not necessary to the success of the process, the air being allowed to escape freely after it has passed from the air-tight pipes or chambers D B through the holes E or F, and thence through the centers of the one or more hubs placed thereon.

What I claim as my improvement is—

1. The series of pipes A and the air-box B, constructed and combined as and for the purpose specified and shown.

2. The air-heating receiver, in combination with the parts A B, as herein specified.

3. A flat supporting-surface having holes E F, in combination with a steam-heated air-receiver, the said holes being in communication with a source of air under pressure, so as to be supplied with a current of air, and adapted to cause dry air to be driven through the interiors of hubs or hub-blocks placed thereon, as herein specified.

4. The within-described method of drying hubs or hub-blocks from the inside by a current of cold or slightly-warmed dry air moved actively through the bores, as herein specified.

In testimony whereof I have hereunto set my hand this 27th day of January, 1879, in the presence of two subscribing witnesses.

JOHN URMSTON.

Witnesses:

CHAS. C. HOFF, Jr.,
THOS. H. SHAFER.